3,344,013
SEPARATOR MATERIAL FOR ACCUMULATOR BATTERIES AND PROCESS OF MAKING THE SAME

Erich Fahrbach, Weinheim an der Bergstrasse, Germany, assignor to Carl Freudenberg Kommanditgesellschaft auf Aktien, Weinheim an der Bergstrasse, Germany, a corporation of Germany
No Drawing. Filed Aug. 20, 1964, Ser. No. 391,031
Claims priority, application Germany, Sept. 21, 1961, F 34,962; Feb. 5, 1962, F 35,935
8 Claims. (Cl. 161—150)

This is a continuation-in-part application of co-pending U.S. application Ser. No. 224,538, filed Sept. 18, 1962, which is now abandoned.

The present invention relates to improvements in the structural modifying of non-woven fleece material to render the same highly porous and highly elastic, and therefore of high absorption capacity, and more particularly to a highly porous and highly elastic structurally modified non-woven fleece material useful as separator material for accumulator batteries and to a process for preparing the same.

Accumulator batteries used in current-day practice consist of a number of successive anodes and cathodes which are usually in the form of plates or sheets that are positioned apart in an electrolyte, with a narrow interval of for example 0.05 mm. or more. The compactness of design, i.e. the positioning of the electrodes as close to one another as possible is to assure as high as possible a load capacity. Nevertheless, in order to prevent a touching of the plates or sheets serving as the electrodes, and in turn a short circuit of the system, the electrode plates or sheets must be kept apart by suitable separators of material inert to the electrolyte and to the reactions taking place at the electrodes.

It will be appreciated, of course, that the separator elements should also be able to perform further functions in order to attain maximum efficiency of accumulator cell operation. In the ideal case, the separator element should exhibit above all the following characteristics:

(1) Resistance to the liquid electrolyte
(2) Resistance to electro-chemical oxidation
(3) High elasticity and accordingly the capacity to adapt to the surfaces of the electrodes
(4) Porosity sufficient to assure unimpeded ionic migration between the electrodes
(5) Filtration capacity for solids materials separated from the electrodes.
(6) Wetting capacity upon contact with the liquid electrolyte and thereby prevention of the establishment of gas bubbles at the separator and at the electrodes.
(7) Adsorption capacity and storage capacity for the electrolyte liquid.

The customary conventional separator materials, however, exhibit these properties only partially, as may be noted from the fact that where the separator materials consist of fabrics, either the porosity is greater and the filtration capacity lower or vice versa. In any case, even when they have been preliminarily roughened, fabrics store only insufficient quantities of the electrolyte liquid. On account of the disposition of the individual threads of the fabric, by reason of the warp and weft, furthermore the danger exists that solid particles situated on the electrodes or separated from them may pass without hinderance through the fabric and eventually cause a short-circuit.

On the other hand, separator elements made of plastic materials having a porous structure are insufficiently elastic and therefore do not cling adequately to the relatively rough electrodes in the desired manner. On account of the film formed on the surfaces of the porous plastic separators, the solids which are separated from the electrodes are not retained by the separators but rather such solids fall off and collect at the bottom of the cell container of the battery. Eventually, the collection of such solids leads to the formation of bridges between the electrodes, causing short-circuits to occur. Additionally, the film formation on porous plastic separator elements has the consequence that the pore volume in separator elements having a low thickness of, for example 0.20 mm. no longer suffices to assure a high reserve capacity for the electrolyte liquid. Furthermore, because of the lack of moistenability of the plastic separator elements which are per se hydrophobic in nature, gas bubbles which form during the electrolytic discharge of the battery are retained on the surfaces of the electrodes as well as on the separator element, such that undesirable polarization effects eventually occur.

From the foregoing cursory examination of the properties and functions of known separator elements for accumulator batteries, the complex mechanisms involved in the use of separator elements in electro-chemical cells and the disadvantages of the customary separator materials become evident.

It is an object of the present invention to overcome the foregoing disadvantages and to provide an efficient and useful separator material for accumulator batteries, having a high absorption capacity for electrolyte liquids, and more particularly highly porous and highly elastic structurally modified non-woven fleece materials having new uses and a process for preparing the same.

Other and further objects of the present invention will become apparent from a study of the within specification and accompanying examples.

It has been found in accordance with the present invention that improved separator materials for accumulator batteries may be provided as well as a process for the preparation of such separator materials to provide them with desirable strength, stability, durability and porosity qualities. Specifically, highly porous and highly elastic structurally modified non-woven fleece material may be used for the purposes of the present invention where such material is produced in a particular manner.

Briefly, the present invention provides a process for attaining a highly porous and highly elastic structurally modified non-woven fleece material which comprises impregnating a fleece material randomly containing comparatively long non-woven fibers consisting of at least one of nylon 6, i.e. polycaprolactam, and nylon 6–6, polyamide fibers of a minimum length of about 30 mm. with a solvent for said non-woven fibers consisting of a low percentage aqueous salt solution, for example 1–10%, to effect superficial preliminary dissolution of the surface portions of said non-woven fibers. The impregnated fleece material is then squeezed under comparatively slight pressure to remove only excess salt solution therefrom and reduce the liquid content to at least about 200% of the fleece dry weight without compacting the fibers and without reducing the porosity of the fleece, and to strengthen initially the fleece material by fusing to one another at their points of contact the superficially dissolved surface portions of the individual non-woven fibers. The fleece material is then dried and finally strengthened by heating the same and subsequently washed to free the fleece material from residual salts remaining therein. Thereafter, the fleece material is finally dried. In accordance with a preferred embodiment of the invention, the fleece material after the final drying is smoothed by calendering techniques.

Suitably the polymer used may be a polyamide such that the resulting polyamide fibers contemplate those of polycaprolactam which is a polyamide of ε-aminocaproic acid, i.e. nylon 6 which is commonly assigned the designation Perlon, as well as those where the polyamide is a polymer of hexamethylene diamine and adipic acid, i.e. nylon 6–6.

Generally, in accordance with one feature of the present invention, the non-woven fibers are staple fibers which posses a staple length of at least 30 mm., and even as high as 80 mm. or more, such fibers being of the same or different types such as highly curled fibers, normally curled fibers and smooth fibers. Mixtures of fibers of different lengths of 30 mm. or more may be used, as well as different degrees of titer, i.e. between about 1.2 and 6 denier. The fleece material may have a weight of about 60 grams per square meter initially and a thickness of the fleece material initially between about 0.28 and 0.35 mm.

The aqueous salt solution used for the impregnating of the fleece material may have a concentration of about 1–10% and is preferably used as a cold impregnating solution at a temperature of about 20° C., although temperatures between about 20–60° C. may generally be used. The impregnating period may take between about 2–60 seconds, but preferably it should only take 5–30 seconds. The aqueous salt solution may be a metal halide salt solution or an alkaline earth thiocyanate salt solution, such as a salt solution selected from the group consisting of $ZnCl_2$, $ZnBr_2$, $CaCl_2$, $Ca(SCN)_2$ and $Mg(SCN)_2$ aqueous salt solutions.

The squeezing step should be carried out under linear pressure as for example with a pair of pressure rollers sufficient to reduce the liquid content of the impregnated fleece material to between about 200–1000% and preferably down to about only 500% of the fleece dry weight, so as not substantially to compact the fibers nor reduce the porosity of the fleece. Accordingly, the excess salt solution will be removed and the fleece material will be strengthened initially by reason of the fusion to one another at their points of contact, by salt bonding, of the superficially dissolved surface portions of the individual non-woven fibers.

The drying and final strengthening is carried out by heating preferably at about 120–150° C., such as by air drying at 140° C., whereas the subsequent washing is carried out preferably in a warm water bath at about 60° C. The final drying is carried out thereafter, preferably at about 120–150° C., such as with hot air at about 140° C.

In accordance with the preferred embodiment of the invention, the fleece material, after the final drying step, is smoothed by calendering at about 130–150° C., using a calendering line pressure of from about 10–100 kilograms per centimeter. This pressure is insufficient under the temperature used to reduce adversely the porosity of the impregnated fleece.

According to one specific embodiment of the invention, therefore, a highly porous and highly elastic structurally modified non-woven fleece material may be obtained which is produced by the process which comprises impregnating a fleece material consisting of randomly interposed non-woven polycaprolactam textile fibers having a staple length of from about 30–80 mm. with a solvent for said non-woven fibers consisting of a 3–10% aqueous salt solution selected from the group consisting of $ZnCl_2$, $ZnBr_2$, $CaCl_2$, $Ca(SCN)_2$ and $Mg(SCN)_2$ aqueous salt solutions, preferably at a temperature of about 20° C., for about 5–30 seconds to effect superficial preliminary dissolution of the surface portions of said non-woven fibers, squeezing under comparatively slight roller pressure the impregnated fleece material to remove only excess salt solution therefrom, preferably down to a liquid content of only about 500%, based on the fleece dry weight, i.e. so as not to compact the fibers nor reduce the porosity of the fleece, and to strengthen initially the fleece material by fusing to one another at their points of contact the superficially dissolved surface portions of the individual non-woven fibers, drying and finally strengthening the fleece material by heating said fleece material at a temperature from about 120–150° C., and preferably with hot air at about 140° C., subsequently washing said fleece material, preferably with hot water at a temperature of about 60° C., to free said fleece material from residual salt remaining therein, and thereafter finally drying said fleece material at a temperature of from about 120–150° C., and preferably with hot air at about 140° C. A preferred aftertreatment of the finally dried fleece material involves the smoothening thereof by calendering at about 130–150° C. using a calendering line pressure of from about 10–100 kilograms per centimeter which is insufficient under the temperature used to reduce adversely the porosity of the impregnated fleece.

In accordance with this preferred embodiment of the invention, the caprolactam fleece material may consist of about 50% highly curled fibers having a titer of about 1.2 denier and a staple length of about 60 mm., about 30% smooth fibers having a titer of about 1.4 denier and a staple length of about 40 mm., about 10% normally curled fibers having a titer of about 3 denier and a staple length of about 30 mm., and about 10% smooth fibers having a titer of about 6 denier and a staple length of about 80 mm., the fleece material having a weight of about 60 grams per square meter, such that the thickness of the fleece material will be about 0.28 mm. before calendering and from about 0.15 to 0.25 mm. after calendering. The air-permeability measured at a reduced pressure of 10 mm. water column of the so-treated material is from about 600–1300 liters per second per square meter of fleece material whereas the absorption capacity of 30% aqueous KOH solution in the fleece material is from about 300–800%.

According to a second preferred embodiment of the invention, a highly porous and highly elastic structurally modified non-woven polyamide fleece material may be provided which is produced by the process which comprises impregnating a fleece material consisting of randomly interposed non-woven nylon 6–6 polyamide textile fibers having a staple length of from about 30–60 mm. with a solvent for said non-woven fibers consisting of a 3–10% aqueous salt solution selected from the group consisting of $ZnCl_2$, $ZnBr_2$, $CaCl_2$, $Ca(SCN)_2$, and $Mg(SCN)_2$ aqueous salt solutions, preferably at a temperature of about 20° C., for about 5–30 seconds to effect superficial preliminary dissolution of the surface portions of said non-woven fibers, squeezing under comparatively slight roller pressure the impregnated fleece material to remove only excess salt solution therefrom, preferably to a liquid content of only about 500%, based on the fleece dry weight, i.e. so as not to compact substantially the fibers nor reduce the porosity of the fleece, and to strengthen initially the fleece material by fusing to one another at their points of contact the superficially dissolved surface portions of the individual non-woven fibers, drying and finally strengthening the fleece material by heating said fleece material at a temperature from about 120–150° C., and preferably in hot air at about 140° C., subsequently washing said fleece material, preferably in warm water at about 60° C. to free said fleece material from residual salt remaining therein, thereafter finally drying said fleece material at a temperature from about 120–150° C., and preferably in hot air at about 140° C.

According to a preferred modification of this embodiment, the fleece material, after the final drying step is smoothed, preferably by calendering at about 130–150° C., and especially at about 130° C. using a calendering line pressure of about 10 kilograms per centimeter which is insufficient under the temperature used to reduce adversely the porosity of the impregnated fleece. The fleece material preferably consists of 100% nylon 6–6 polyamide fibers in accordance with this embodiment having a titer of about 1.2 to 6 denier and a staple length of from about 30–60 mm., the fleece material having a weight of about 60 grams per square meter, such that thickness of the fleece material is about 0.35 mm. before calendering and about 0.28 mm. after calendering. The air-permeability measured at a reduced pressure of 10 mm. water column in this case is about 1400 liters per second per square meter of fleece material, while the absorption capacity of 30% aqueous KOH solution in the fleece material is about 1,000%.

In accordance with a further feature, i.e. endless feature, of the invention, the fleece material used possesses a median fiber length of about 100 mm., a median fiber thickness of about 6–8 microns, and a weight of about 60–90 grams per sq. meter, the fibers consisting of nylon 6 and/or nylon 6–6 filaments, the impregnation being carried out at a temperature of about 20–60° C. for a period of about 1–10 minutes with the salt solution having a concentration of about 1–2% by weight. The liquid content, after impregnation, is reduced to about 200–1000% and preferably 200–600%, of the fleece dry weight by squeezing in the foregoing manner whereupon hot air treatment at about 120–150° C. produces drying of the fleece. The dried fleece is then washed intensively in warm water, preferably 60° C., to remove residual salt and then the fleece material is finally dried with hot air at about 120–150° C., to produce a fleece material having a highly porous and highly elastic structurally modified non-woven fleece condition. The fleece may also be calendered as aforesaid.

The fleece material used in accordance with this further feature, i.e. endless feature, of the present invention contains randomly substantially endless non-woven fibers in spin bonded form and is preferably prepared in the manner disclosed in copending U.S. application Ser. No. 254,601, filed Jan. 29, 1963 and/or co-pending U.S. application Ser. No. 302,370, filed Aug. 15, 1963, both now abandoned, and copending U.S. application Ser. No. 341,489, filed Jan. 27, 1964, which is a continuation-in-part of said applications Ser. No. 254,601 and Ser. No. 302,370, all three of which are in the name of Ludwig Hartmann, i.e. by the spin bonding method. It will be realized that, pursuant to Rule 79 of the Rules of Practice of the U.S. Patent Office in Patent Cases (effective Mar. 1, 1949 and subsequent amendments), notice is hereby given that the contemplated spin bonding preparation of endless fleece materials (prior to impregnation in accordance with the present invention) is disclosed and disclaimed in such three Hartmann copending applications. In this connection, for example, a multitude of fused polymer masses may be passed in the form of filaments from a corresponding multitude of spinneret holes while directing a gas stream into impinging and entraining relation with the filaments to distend them and orient polymer molecules thereof in the direction of the axes of the filaments. The spinning speed may be between 800–2000 meters/minute, for example, depending on the thickness of the filaments in question. The filaments are distended within a distance of about 2–5 mm. from the spinneret hole and for a length of 300–600 mm. for example, to reduce the diameter from the diameter of the spinneret holes in the ratio of at least 30:1, for example from about 300 to 10 or 15 microns in filament diameter. The spinneret holes may have a diameter of about 0.1–1.0 mm. and an axial length of 3–6 times the diameter with a lateral spacing of 1–3 mm. apart. The filaments are cooled to set condition wherein molecular orientation is retained, the filaments being maintained in the distended condition having such molecular orientation at least partially by a gas stream directed against the filaments to urge them to the distended condition while keeping the individual filaments separate from one another until set. The velocity of the gas stream is advantageously higher than the spinning speed to achieve the desired stretching or distending as well as solidification and drawing of the plastic substance, i.e. before collection. The set filaments are finally collected as a non-woven fleece in which the more or less endless filaments are disposed in statistically varying or random crossing relation.

By subjecting a spin bonded fleece material, i.e. in accordance with said endless feature, such as that produced in the foregoing manner, and which may consist of at least one of nylon 6–6 polyamide and nylon 6, i.e. polycaprolactam, polyamide fibers, to the impregnation, drying, washing, and final drying steps of the present invention, the highly porous and highly elastic structurally modified non-woven fleece material may be obtained. The fleece material prepared in the foregoing manner already contains fibers which are partially agglutinated or bonded to one another, but the impregnation, drying, washing, and final drying carried out in accordance with the present invention serve to structurally modify and further salt bond the endless fibers at their points of contact to produce a fleece material having a stable structure of high strength yet highly porous and highly elastic due to the distended, reduced diameter nature of the starting fleece.

Generally, the spin-bonded endless, non-woven fibers, in accordance with said endless feature, should possess a median length of at least about 100 mm. or more, such lengths being considered for the instant purposes as endless in view of the distended, reduced diameter condition and random crossing relation of such fibers in the fleece prepared. Preferably, the fleece material should have a median fiber thickness of about 6–8 microns and a weight of about 60–90 grams per sq. meter.

It will be appreciated further that the spin-bonded, non-woven fiber fleece material, i.e. in accordance with said endless feature, after impregnation by the process of the present invention also exhibits very good resistance to liquid electrolytes and to electrochemical oxidation, possesses a very good wetting capacity upon contact with liquid electrolytes, as well as a very good filtration capacity for solid materials present in liquid electrolytes, and has an adsorption capacity and storage capacity for electrolyte liquids, whereby the salt-bonded endless fiber structurally modified fleece product of the present invention is eminently suitable for use as a separator element in an accumulator cell.

Furthermore, the present invention represents an improvement in the process for operating an alkaline accumulator cell or battery having an alkaline electrolyte, and a pair of opposing electrodes immersed in the electrolyte and separated therein from one another by a separator element interposed therebetween, such improvement comprising operating the alkaline accumulator using as the separator element a highly porous and highly elastic structurally modified non-woven fleece material produced by the process above described.

It will be appreciated that the non-woven fiber fleece material treated in accordance with the present invention exhibits the seven desirable characteristics enumerated above, i.e. resistance to the liquid electrolyte; resistance to electrochemical oxidation; elasticity, and attendant capacity to adapt to the surfaces of the electrodes; porosity, and consequential assurance of unimpeded ionic migration between the electrodes; filtration capacity for solids separated from the electrodes; wetting capacity for the liquid electrolyte and resultant prevention of the establishment of gas bubbles at the separator and electrodes; and adsorption capacity and storage capacity for the liquid electrolyte.

It should be noted that not every nylon 6, i.e. polycaprolactam, fiber material or nylon 6–6 polyamide fiber material which is strengthened by preliminary or initial dissolution using a dilute salt solution will exhibit the aforementoned characteristics so as to render the fleece material suitable as separator material for an alkaline accumulator cell. Significantly, for the preparation of separator materials of fiber fleeces in accordance with the present invention, only comparatively long fibers are used, i.e. those over one inch in length. In this connection, it is already known to subject comparatively short caprolactam fibers, i.e. those less than one inch in length, e.g. 0.2 to 2 mm. long, to the prolonged action, e.g. up to 30 minutes, of concentrated salt solutions, i.e. $ZnCl_2$, $ZnBr_2$, $CaCl_2$, $Ca(SCN)_2$, $Mg(SCN)_2$, etc., solutions whereby such caprolactam fibers may be converted into a synthetic paper. In order to carry out this synthetic paper making process, the usual machines and techniques customary in the paper industry are employed. However, such a synthetic paper obtained in the foregoing manner is much too dense and unelastic to be able to find application as a separator material in the manner contemplated by the present invention.

In contrast thereto, comparatively long nylon 6, i.e. polycaprolactam, or nylon 6–6, polyamide fibers, i.e. of at least 30 mm. length, are used herein and instead of applying a concentrated salt solution, the present invention contemplates using a salt solution in a relatively weak concentration of about 1–5% and in any case no more than about 10%. Besides, the impregnation with the salt solution only takes place for a period of several seconds, e.g. 5–30 seconds and at most 2–60 seconds, rather than for the prolonged period of up to 30 minutes contemplated by the prior art papermaking process using short caprolactam fibers and dispersing and beating techniques rather than impregnating techniques (see U.S. Patent No. 2,869,973). Notably the treatment with the comparatively weak salt solution in accordance with the present invention is carried out only as long as is necessary to permit the immediate wetting through of the fiber fleece material with the solvent. Immediately, thereafter, the wet material is squeezed under comparatively slight pressure as aforesaid and dried at increased temperature. Since the fiber material web or fleece which is strengthened in this manner still contains residual amounts of salts which may cause disturbances in the use of the fleece later on, the material is rewashed in a water bath until the salt is substantially completely washed out. The final drying and appropriate smoothing of the surface of the so-modified, non-woven fleece material may then take place, the smoothing of the surface of the material preferably being carried out by calendering at increased temperatures obviously using pressures insufficient under the temperature conditions to reduce adversely the porosity of the impregnated fleece.

Advantageously, in accordance with the present invention, the separator material thus produced has proved to be particularly suitable for use in accumulator cells or batteries having concentrated alkali solutions as electrolyte. The separator material is highly elastic and highly porous and its labyrinth-like structure, in contrast to that of woven fabrics, permits an excellent filtration capacity and unexpectedly high absorption capacity for the electrolyte to be attained. The latter is of substantial advantage, particularly in so-called closed batteries, in which the gas formed during the discharge cycle may not escape from the electrolyte space, and which, for this reason, are only partially filled with the electrolyte liquid, for example about 30% KOH aqueous solution. In such instance, the separator material must assume the function of a wick and/or a sponge, in order to be able to supply the electrodes with a sufficient quantity of electrolyte liquid, not only at the portion of the electrode surfaces immersed in the liquid electrolyte but also at the portions of the electrode surfaces in the gas space of closed batteries containing gas formed during the discharge cycle, whereby the full-charge capacity of the accumulator cell or battery may be utilized. By reason of the initial or beginning dissolution of the non-woven nylon 6, i.e. polycaprolactam, and/or nylon 6–6, polyamide fibers in accordance with the present invention by means of the above-noted salt solutions, the wetting capacity of the fiber structure which is produced is so much improved, as opposed to untreated fibers, that the complete wetting through of the fiber fleece separator material with the electrolyte is assured as well as depolarization through rapid elimination of gas bubbles occurring during the discharge cycle. The latter may still be additionally improved by smoothening the surfaces of the separator material, for example by passing the web of fleece material between a pair of calender rollers under suitable pressure as indicated hereinabove.

The textile fiber fleece material contemplated by said one feature of the present invention is intended to connote a non-woven sheet structure of a fiber skeleton as conventionally understood in the art, and, for instance, exemplified in U.S. Patents 2,719,795, 2,719,802, 2,719,803, and 2,719,806 although fibers having a critical minimum length of at least about 30 mm. must be used. Such fiber fleeces may be prepared in the conventional manner, either by superimposing multiple individual thinner webs of intermingled fibers or by making a thicker, substantially single layer fleece. Individual fleece webs may be prepared by carding, using, for instance, conventional carding rolls, or by flocculation, using, for instance conventional flocculation suction drums. If carded fleeces are to be used with at least some polyposed fiber arrangement, multiple thin webs are superimposed at an angle with respect to the principle direction of fibers in the individual webs, to thereby obtain a multitude of cross-points between fibers composing the aggregate fleece. Suction flocculation-prepared fiber fleeces normally already possess polyposed fibers. The preparation of the initial, i.e. "loose" fiber fleece, (thin or heavy) is preferably carried out in a continuous manner in accordance with conventional methods and equipment, to give fleece webs of considerable length, thus permitting substantially continuous operations, including fiber bonding through impregnation with the relatively weak aqueous salt solutions indicated above.

In accordance with a practical application of the invention, a suitable loose fiber fleece constituted as hereinabove set forth, and having all fibers of a minimum length of 30 mm., i.e. either staple fibers or endless spin-bonded fibers, is first converted into an interstitially absorbent fiber-bonded skeleton structure by subjecting the loose fleece after impregnation with the salt solution to compression by squeezing and temperature conditions causing contact between adjacent fibers while the fiber surface is sufficiently softened, dissolved or swelled to permit cementitious bonding or fusing together of the individual fibers at their points of contact, the time of treatment being insufficient to produce that destructive flowability within the individual fibers at which appreciable loss of their structure results. This fusing of the initially loose fleece structure may be conveniently accomplished by passing the loose structure through the gap or nip of pressure rollers. The compression applied to the loose fleece is then determined empirically.

The swelling, softening, or dissolution contemplated by the present invention is that which superficially and preliminarily modifies the surface portions of the non-woven fibers sufficiently to permit self-cementitious interbonding of the fibers by fusing such surface portions to one another at their points of contact during the squeezing and initial strengthening step.

It will be appreciated, in this connection, that the self-cementitious interbonding of the endless fibers by fusion as a result of the impregnation with the aqueous salt solution represents an additional modfication of the original structure of the spin-bonded fleece material, i.e. in accordance with said endless features, such that two different kinds of bonds are actually present in the same structure. The spin-bonding step preliminarily provides a fleece structure which is comparatively loose and vulnerable to disintegration under relatively hard manipulation and mechanical tearing forces, whereas after the impregnation and squeezing steps in accordance with the present invention, more intense bonding is achieved at the majority of the points of contact of the randomly crossing fibers in the fleece, whereby properties are imparted to the fleece more favorable than those possible using the spin-bonding technique or the aqueous salt impregnation technique alone.

It will be realized that by providing initially the fleece material by spin-bonding techniques, in accordance with said endless feature, molecular orientation of the molecules in the monofilaments forming the fibers of the fleece will be attained to increase the strength and enhance the properties of the fibers and in turn such fleece, whereby the subsequent impregnation in the manner of the invention will lead to the highly porous and highly elastic durable and workable structure desired.

The following examples are set forth for the purpose of illustrating the present invention, and it will be understood that the invention is not to be limited thereby:

Example 1

A carded fleece of polycaprolactam fibers (i.e. nylon 6 as designated by the term "Perlon"), produced according to customary techniques and containing 50% highly curled polycaprolactam fibers with a titer of 1.2 denier and a staple of 60 mm., 30% smooth polycaprolactam fibers with a titer of 1.4 denier and a staple of 40 mm., 10% normally curled polycaprolactam fibers with a titer of 3 denier and a staple of 30 mm., 10% smooth polycaprolactam fibers with a titer of 6 denier and a staple of 80 mm., having a weight of 60 grams per square meter, is conducted by means of a sieve-impregnating-machine between a pair of sieves of $V_2A$-wire or a felt covered padder through a bath of 5% $ZnCl_2$ aqueous solution maintained at about 20° C., and thereafter subjected to compression by squeezing the running web of carded fleece material between a pair of padder rollers under comparatively slight pressure to remove only excess salt solution therefrom and reduce the liquid content to a wet-absorption content of 500%, based upon the dry web material, i.e. without compacting substantially the fibers and without reducing the porosity of the fleece, the squeezed, impregnated fleece material thereafter being dried in a horizontal drier using hot air at 140° C. The aqueous salt solution ($ZnCl_2$) serves as a solvent for the nonwoven fibers in the fleece sufficiently to effect superficial preliminary dissolution, softening or swelling of the surface portions of the non-woven fibers, all these terms being used to describe the self-cementitious or interbonding disposition of the fibers at their points of contact whereby during the squeezing step excess salt solution is removed and the squeezing pressure serves to strengthen initially the fleece material by fusing to one another at their points of contact the superficially dissolved surface portions of the individual non-woven fibers. The drying with hot air serves to finally strengthen the fleece material. Thereafter, the already strengthened fleece material web structure is washed in a warm water bath at about 60° C. in order to free the fleece material from residual salt adhering thereto. The washed fleece material is then finally dried, as for example in hot air at about 140° C. The fleece material web of textile fibers obtained in the foregoing manner may be used as a separator element material in an accumulator battery cell between a pair of opposing electrodes, the fleece material in the so-treated condition as noted above possessing fully the characteristics of resistance to the electrolyte liquid and to electro-chemical oxidation; elasticity, and capacity to adapt to the surfaces of the electrode; porosity sufficient to assure unimpeded ionic migration between the electrodes; filtration capacity for solids separated from the electrodes; wetting capacity for the electrolyte liquid, and concomitant avoidance of the establishment of gas bubbles at the separator and the electrodes; and adsorption capacity and storage capacity for the electrolyte liquid.

In order to permit the gas bubbles which are generated during the discharge cycle of the electro-chemical cell, i.e. an accumulator battery cell. to escape more readily from the separator material, the surface of the separator material composed of the fleece treated in the foregoing manner is smoothed by calendering at 130° C. using a line pressure of 10 kilograms per centimeter in one or both directions, depending upon the calendering arrangement used. The thickness of the running web of fleece material as measured with a micrometer prior to the calendering, amounts to about 0.28 mm., whereas the smoothed material after calendering has a thickness of 0.25 mm. The air-permeability, measured with a reduced pressure of 10 mm. water column is approximately about 1300 liters per second per square meter which shows that the calendering under the temperature conditions used is insufficient to reduce adversely the porosity of the impregnated fleece. The adsorption capacity of 30% aqueous potassium hydroxide solution amounts to about 1200% based upon the original dry weight, this amount corresponding to a weight absorption of about 720 grams per square meter.

Example 2

Example 1 is repeated using a carded fleece of polyamide fibers (nylon 6–6), said fibers consisting of 100% polyamide fibers having a titer of 1.2–6 denier and a staple of 30–60 mm. with a weight of 60 grams per square meter. The running web of fleece material is conducted in this case through a 10% $ZnCl_2$ aqueous salt solution, all other conditions remaining the same. A similar 500% web absorption content of the squeezed web material is obtained and the product is dried, washed, and finally dried in the same manner as in Example 1. The product obtained is fully useful in the same way as the product obtained in accordance with the procedure of Example 1.

In order to achieve the more efficient escape of gas bubbles occurring in the discharge cycle of the electrochemical cell in which the separator material may be used, the smoothing procedure of Example 1 is repeated under the same calendering conditions. The thickness of the running web, as measured with a micrometer amounts to about 0.35 mm. prior to calendering and about 0.28 mm. after the calendering has been carried out. The air-permeability as measured with a reduced pressure of 10 mm. water column is approximately 1400 liters per second per square meter of the smoothed material which shows that in this case as well the calendering pressure under the temperature conditions used is insufficient to reduce adversely the porosity of the impregnated fleece. The absorption capacity of 30% aqueous potassium hydroxide solution is about 1,000%, based upon the dry web material, the same corresponding to a weight adsorption of about 600 grams per square meter. The polyamide separator material obtained in the foregoing manner finds particular application in those electrochemical cells in which the electrolyte liquids become hot during cell operation.

Example 3

The procedure of Example 1 is repeated and the separator material produced is calendered with a line pressure of 100 kilograms per centimeter at 150° C. instead of at 10 kilograms per centimeter line pressure using rollers heated to 130° C. While the thickness of the unsmoothed material, prior to calendering, as measured with a micrometer amounts to about 0.28 mm., the thickness of the running fleece web material after calendering amounts to about 0.15 mm. The air-permeability of the so-smoothed material amounts to about 600 liters per second per square meter of fleece material, measured with a reduced pressure of 10 mm. water column showing that even this calendering pressure under higher temperature conditions is still insufficient to reduce adversely the porosity of the impregnated fleece. The adsorption capacity for 30% aqueous potassium hydroxide solution in this case amounts to about 300%, which corresponds to a weight adsorption of 180 grams per square meter of fleece material. Advantageously, the so-calendered material obtained in the foregoing manner finds wide application alone as well as in combination with uncalendered material in open alkali accumulator cells. Where the plate-distances of the electrodes are kept very narrow, the separator material obtained in accordance with this example renders good service especially where used per se alone and without being combined with non-calendered fleece material.

*Example 4*

Example 2 is repeated, but in this case the calendering step is carried out in accordance with that of Example 3. In the same way, good results are achieved and the separator material obtained is useful especially where the cell is operated with hot electrolyte liquids.

*Example 5*

In accordance with said endless feature, as disclosed in said copending Hartmann applications, granulated polycaprolactam (rel. viscosity in concentrated $H_2SO_4$: 2.28) was melted in a worm press and fed at a temperature of 260° C. to a spinning pump. The spinning pump fed the melt to a spinneret heated to 290° C., which consisted of a 180-mm.-long row of 90 holes 0.3 mm. in diameter and equally spaced apart. The row of holes was bounded above and below, at a distance of 0.4 mm., by an air slit from which an air current heated to 300° C. was ejected. The velocity of the air current was adjusted so that the filaments leaving the individual spinning holes were stretched within a distance of 2 mm. away from the spinneret from a thickness of 300 microns to 10 microns. Furthermore, the air current was so conducted that the filaments issuing from the individual holes could not contact one another. This was achieved over a relatively long distance of about 80 mm. by the injection of secondary air currents over the breadth of the rank of filaments. At a distance of 90 cm. from the spinneret, the rank of filaments was caught by means of a screen belt oscillating at a frequency of 3–6 times per second, with a suction behind it, and the filaments were thus laid down in criss-crossing loops. This was brought about by a ratio of spinning speed to outfeed speed on the order of 1000:10. The absolute spinning speed was 1000 meters per minute.

The caught web of fibers, now in the form of a spin-bonded fleece, containing a median fiber thickness of 6–8 microns, a median fiber length of 100 mm., i.e. endless fibers, and a weight of 90 grams per sq. meter, is impregnated in accordance with the process of the present invention by means of a sieve impregnating machine with a 2% zinc chloride solution at about 20° C., freed from excess zinc chloride solution by squeezing to 200% of the fleece dry weight, i.e. without compacting the fibers and without substantially reducing the porosity of the fleece, dried in a horizontal drier, and washed intensively in warm water until all salt has been washed out, and then finally dried using a procedure analogous to that of Example 1. In this manner a fleece material is obtained having similar characteristics to the fleece material of Example 1, and usable in an alkaline accumulator cell in the same way.

*Example 6*

A spin-bonded fiber fleece produced according to Example 5 but with a weight of 60 grams per sq. meter is impregnated in accordance with the process of the present invention in the gap of a felt-pad presser (padder) with a 1% zinc chloride solution, squeezed to 600% of the fleece dry weight, dried, washed, and finally dried, as described in Example 5. The highly porous and highly elastic fleece material thus obtained has a thickness of 0.2 mm. and is well suited as a separator in alkali-batteries, because of its specific characteristics, such as for example good wetting capacity and resistivity in 30% potassium liquor, high capacity of absorption and good resistance to electrochemical oxidation conditions as well as very low electrical resistance.

*Example 7*

In accordance with said endless feature, as disclosed in said copending Hartmann applications, granulated polyamide (polycaprolactam, melting temperature 210° C., relative viscosity 2.28) was melted in an extrusion worm press at temperatures increasing forwardly of 200, 220, 250, and 270° C. and fed to a spinning pump. The spinning pump pumped the material to a spinneret heated to 220° C., which consisted of 4 rows of holes 4 cm. long containing each 20 holes with a diameter of 0.3 mm. Each row of spinning holes was separated from the others by air slots of 0.2 mm., height, spaced vertically about 0.4 mm. therefrom whereby each row had an upper and lower air slot along its length. The continuous filaments passing from the nozzle in the form of broad, non-cohering bands were each seized above and below by air currents of 200 m./sec., heated to 220° C., and pulled forward thereby from a nozzle speed of 1 m./min. to about 1200 m./min. within a distance of 3 mm. from the nozzle exit over a distance of about 60 cm. The filaments were collected by suction on an oscillating screen belt having openings of about 2 mm. diameter in the same manner as in Example 5, in the form of a fleece. The spin-bonded fleece obtained is treated in accordance with the present invention using the impregnation procedure of Example 5 to form the highly porous and highly elastic fleece material desired. Similar results are obtained as in Example 5, and the product is thereby usable for similar purposes.

*Example 8*

The procedure of Example 6 is repeated using in this case the spin-bonded fleece material, covered by said copending Hartmann applications prepared in accordance with Example 7. Similar results are obtained.

It will be seen from the foregoing Examples 5–8, and the disclosure of said copending Hartmann applications, that the temperature of the gas used to maintain the filaments in separate, distended relation decreases due to adiabatic expansion, whereupon the plastic filaments are cooled to set condition. Actually, a second gas stream may be directed at an angle or even perpendicular to the impinging and entraining gas stream for distending the filaments, with the result that the second gas will aid in collecting the filaments after the same have been set by the first gas. The second gas tends to break up the plane of the filaments and to cause such filaments to cross one another in a random manner so that the formation of the fleece, for example, on a perforated structure, preferably arranged perpendicularly or transversely to the path of the first gas, will be facilitated. Suction or vacuum conditions may be applied to the fleece form structure upon which the set filaments are collected in a random manner and in fact the fleece form structure may be oscillated with respect to the plane of the filaments to ensure the random crossing disposition of the individual filaments in the fiber fleece which is collected.

In each of the foregoing examples, in the impregnation procedure of the present invention, the aqueous salt solution ($ZnCl_2$) serves as a solvent for the non-woven fibers in the staple fiber fleece or spin-bonded fleece sufficiently to effect superficial preliminary dissolution, softening, or swelling of the surface portions of the non-woven fibers, all these terms being used to described the self-cementitious or interbonding dispostion of the fibers at their points of contact whereby during the squeezing step excess salt solution is removed and the squeezing pressure serves to strengthen initially the fleece material by fusing and salt bonding to one another at their points of contact the superficially dissolved surface portions of the individual non-woven fibers. Similar results are obtained following the foregoing procedures in Examples 1 to 8 using $ZnBr_2$, $CaCl_2$, $Ca(SCN)_2$ and $Mg(SCN)_2$ aqueous solutions for impregnating and salt bonding fiber fleeces. The drying with hot air serves to finally strengthen the fleece material.

Thereafter, the already strengthened fleece material web structure is washed in warm water at about 60° C. in order to free the fleece material from residual salt adhering thereto, with the final drying also taking place in hot air at about 140° C. In each instance, highly porous and highly elastic products are obtained which may be used in the form of separators in an accumulator battery cell between a pair of opposing electrodes, with greater efficiency than was possible heretofore.

While the specification and examples have been set forth by way of illustration and not limitation, it will be realized by the artisan that various changes and modifications may be made herein without departing from the spirit and scope of the present invention, which is to be limited only by the scope of the appended claims.

What is claimed is:

1. Process for providing a highly porous and highly elastic structurally modified non-woven fleece material which comprises impregnating a fleece material randomly containing endless spin bonded polyamide fibers with a low percentage aqueous salt solution to effect superficial preliminary dissolution of the surface portions of said non-woven fibers, squeezing under comparatively slight pressure the impregnated fleece material to remove only excess salt solution therefrom and reduce the liquid content to at least about 200% of the fleece dry weight without substantially compacting the fibers and without reducing the porosity of the fleece, and to strengthen initially the fleece material by fusing to one another at their points of contact the superficially dissolved surface portions of the individual non-woven fibers, drying and finally strengthening the fleece material by heating said fleece material, subsequently washing said fleece material to free said fleece material from residual salt remaining therein, and thereafter finally drying said fleece material, said fleece material having been prepared prior to impregnation by issuing a multitude of fused polymer masses in the form of endless filaments from a corresponding multitude of spinneret holes, directing a gas stream into impinging and entraining relation with the issuing filaments to distend them and orient polymer molecules thereof in the direction of the axes of the filaments, the filaments being distended to reduce the diameter from the diameter of the spinneret holes in the ratio of at least 30:1, cooling the filaments to set condition wherein molecular orientation is retained and maintaining the filaments in distended condition having said molecular orientation at least partially by a gas stream directed against the filaments to urge them to the distended condition, and collecting the set filaments as a fleece in which such endless filaments are disposed in random crossing relation.

2. Process according to claim 1 wherein the fleece material is smoothed by calendering after final drying.

3. Process according to claim 1 wherein said salt solution has a concentration of about 3–10%, the squeezing is carried out under linear pressure to reduce the liquid content to between about 200–1000% of the fleece dry weight, the drying and final strengthening is carried out by heating at about 120–150° C., the subsequent washing is carried out in a warm water bath, and the final drying is carried out at about 120–150° C.

4. Process according to claim 3 wherein the impregnating is carried out for a period of between about 1–10 minutes with a warm aqueous salt solution at about 20–60° C. selected from the group consisting of $ZnCl_2$, $ZnBr_2$, $CaCl_2$, $Ca(SCN)_2$, and $Mg(SCN)_2$ aqueous salt solutions, the squeezing is carried out under linear pressure to reduce the liquid content to about 500% of the fleece dry weight, the drying and final strengthening is carried out with hot air at about 140° C., the warm water bath for the washing is used at about 60° C., and the final drying is carried out with hot air at about 140° C.

5. Process according to claim 4 wherein after the final drying step the fleece material is smoothed by calendering at about 130–150° C. using a calendering line pressure between about 10–100 kg./cm.

6. Process for the production of highly porous and highly elastic structurally modified non-woven spin bonded fleece sheet material which comprises impregnating a fleece material randomly containing endless non-woven polyamide fibers with a solvent for salt-bonding such non-woven fibers consisting of a low percentage aqueous salt solution of up to about 2% by weight concentration, drying and subsequently washing said fleece material to free said fleece material from residual salt remaining therein, and thereafter finally drying said fleece material to provide the highly porous and highly elastic structurally modified non-woven fleece sheet material, said fleece material prior to impregnating having been prepared by issuing a multitude of fused polymer masses in the form of endless filaments from a corresponding multitude of spinneret holes, directing a gas stream into impinging and entraining relation with the issuing filaments to distend them and orient polymer molecules thereof in the direction of the axes of the filaments, the filaments being distended to reduce the diameter from the diameter of the spinneret holes in the ratio of at least 30:1, cooling the filaments to set condition wherein molecular orientation is retained and maintaining the filaments in distended condition having said molecular orientation at least partially by a gas stream directed against the filaments to urge them to the distended condition, and collecting the set filaments as a fleece in which such endless filaments are disposed in random crossing relation.

7. Highly porous and highly elastic structurally modified non-woven fleece material randomly containing endless spin bonded polyamide fibers fused to one another at their points of contact by a bonding salt.

8. Fleece material according to claim 7 wherein said fibers are selected from the group consisting of nylon 6 and nylon 6–6 fibers.

References Cited

UNITED STATES PATENTS

| | | | |
|---|---|---|---|
| 2,579,589 | 12/1951 | Lehmberg | 136—145 |
| 2,591,755 | 4/1952 | Wilson et al. | 136—146 X |
| 2,869,973 | 1/1959 | Hubbard et al. | 8—130.1 |
| 3,121,658 | 2/1964 | Orsino et al. | 135—146 X |

WINSTON A. DOUGLAS, *Primary Examiner.*

ALLEN B. CURTIS, *Examiner.*

D. L. WALTON, *Assistant Examiner.*

UNITED STATES PATENT OFFICE
CERTIFICATE OF CORRECTION

Patent No. 3,344,013 September 26, 1967

Erich Fahrbach

It is hereby certified that error appears in the above numbered patent requiring correction and that the said Letters Patent should read as corrected below.

Column 3, line 6, for "posses" read -- possess --; column 5, line 46, for "disclaimed" read -- claimed --.

Signed and sealed this 1st day of October 1968.

(SEAL)
Attest:

Edward M. Fletcher, Jr.
Attesting Officer

EDWARD J. BRENNER
Commissioner of Patents